Patented Mar. 3, 1942

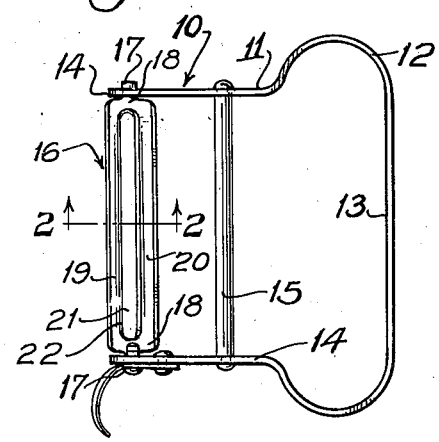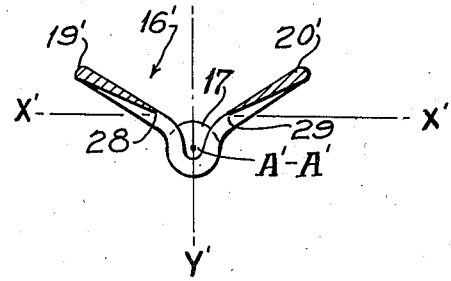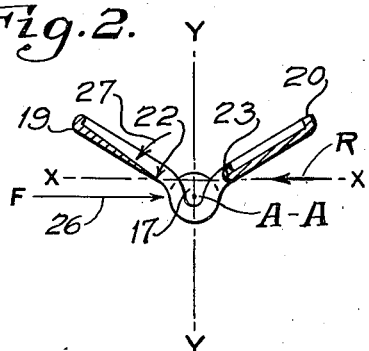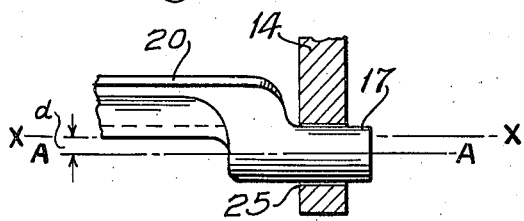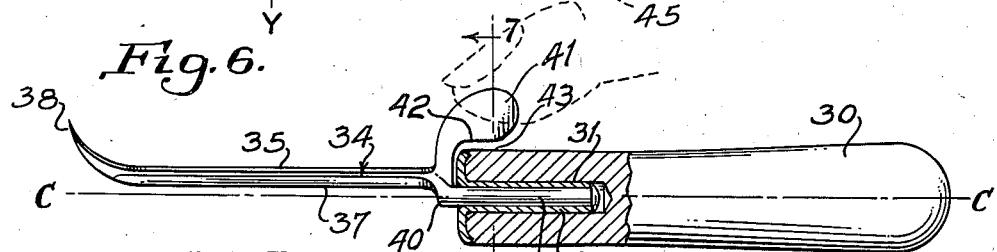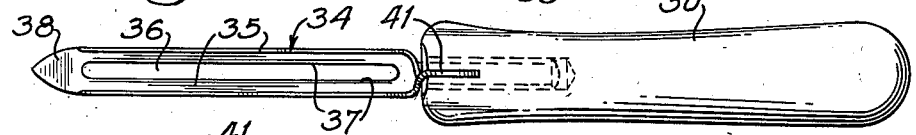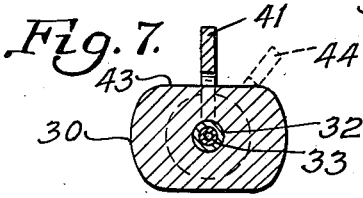

2,274,815

UNITED STATES PATENT OFFICE 2,274,815

VEGETABLE PEELER

Jesse P. Whann, Los Angeles, Calif., assignor to Ralph P. De Vault, Arcadia, Calif.

Application August 1, 1939, Serial No. 287,802

8 Claims. (Cl. 30—279)

My present invention relates to vegetable peelers of the type disclosed in Patent No. 2,106,796, granted February 1, 1938, to Ralph P. De Vault, and relates in particular to a simple arrangement of rotatable cutter and handle to produce an improved action of the cutter in following the contour of the surface of an article being peeled.

It is the principal object of the present invention to provide a peeler comprising a handle and a cutter pivotally supported by the handle by use of a pivot or pivot means defining an axis of rotation for the cutter residing in a plane offset downward from the cutting plane defined by the cutting edge of the cutter and the guide bar which is spaced ahead of the cutting edge, whereby the reaction to the pulling or moving force applied to the cutter through the pivot means will produce a rotative effect in the cutter to hold the cutting edge firmly down against the article being peeled, and cause such cutting edge to readily follow into sharp depressions in the surface of an article being peeled, without a tendency for the cutting edge to skip over portions of the surface of the article.

It is an object of the invention to provide a cutter in the form of an elongated loop having substantially parallel side members connected at their ends by end members, and in which cutter either or both of the side members may be sharpened so as to provide cutting edges which lie along opposite sides of a slot. It will be understood that when the cutter is moved in one direction the following cutting edge has cutting effect and the leading edge merely serves as a guide to rest against the surface of the article to be peeled ahead of the edge which is removing a peel. In the present invention at least one of the end members of the loop-shaped cutter is provided with a projecting shaft element, which shaft element defines or provides an axis of rotation for the cutter extending substantially parallel to the cutting edge and in a position below the cutting plane defined by the lower portions of the side members of the cutter which engage the surface of the article to be peeled.

It is a further object of the invention to provide a peeler and slicer including an elongated handle defining a longitudinal center line, and a loop shaped cutter extending from the front end of the handle so that the side members of the cutter will lie substantially parallel to and spaced from the longitudinal center line, this cutter having a gouge at the front end thereof and having an engageable projection whereby rotation of the cutter relative to the handle may be prevented when the gouge is being employed to dig out a desired portion of the article being peeled.

Further objects and advantages of the invention will be brought out in the following part of the specification.

Referring to the drawing which is for illustrative purposes only:

Fig. 1 is a face view embodying a preferred form of my invention.

Fig. 2 is an enlarged cross-section taken on the plane indicated by the line 2—2 of Fig. 1.

Fig. 3 is a side view corresponding to Fig. 2.

Fig. 4 is an enlarged cross-section through a cutter, according to my invention, having both side members sharpened so as to provide cutting edges which will be effective when the cutter is moved in opposite directions.

Fig. 5 is a plan view of an alternative form in which my invention may be embodied.

Fig. 6 is a partly sectioned side view corresponding to Fig. 5.

Fig. 7 is a cross-section taken as indicated by the line 7—7 of Fig. 6.

The peeler 10 shown in Fig. 1 has a handle 11 formed by bending a flat metal strip 12 so as to provide a grip portion 13 and a pair of forwardly extending legs or cutter supports 14 which are held rigidly in spaced arrangement by a crossbar 15. A cutter 16 is pivotally supported between the supports 14 by means of shaft elements or trunnions 17 which project upward from the end members 18 of the cutter 16.

The cutter 16 is in the form of an elongated loop and has side members 19 and 20, connected together at their ends by the end members 18. The cutter 16 is preferably a metal stamping having the form of a channel with a slot 21 along the bottom thereof, and the side members 19 and 20 slope downward toward this slot 21, as shown in Fig. 2. The side member 19 is sharpened so as to form a cutting edge 22 along one side of the slot 21, and the lower portion 23 of the side member 20 may be slightly curved so as to provide a rounded downwardly presented surface for engagement with the article which is being peeled or from which slices are being removed.

As shown in Fig. 3, each trunnion 17 may be formed in the stamping operation from the sheet metal from which the cutter 16 is stamped. This trunnion 17 is brought down with respect to the plane X—X defined by the cutting edge 22 and the lower portion 23 of the side members 19 and 20, to such position that an axis of rotation A—A will be defined by the trunnions 17, such axis A—A being spaced a distance *d* below the cutting plane X—X, as shown in Figs. 2 and 3. The axis A—A extends parallel to the cutting edge 22 and to the lower portion 23 of the side member 20, and preferably lies in a crossing plane Y—Y which is not centralized with respect to the slot 21 but is closer to the inner edge of the side member 20 than to the cutting edge 22. This preferred location of the axis A—A is shown in Fig. 2, but as hereinafter explained, this position of the axis A—A is not essential to the invention, for reasonably good results are obtainable when the axis A—A is offset in either direction from the position in which it is indicated in Fig. 2, so long as the essential characteristic of the axis A—A being spaced below the plane X—X is preserved in the structure.

In the use of the device, movement of the handle 10 transmits force from each of the supports 14 to the trunnions 17 which extend into openings in the supports 14, such as the opening 25 shown in Fig. 3. The force thus transmitted to the cutter 16 is along the line or plane indicated by the arrow 26 of Fig. 2. The reaction R is along the plane X—X, with result that a rotational force is produced in the cutter, as indicated by the arrow 27, this rotational force tending to cause downward rotation of the side member 19 to produce a positive digging in of the cutting edge 22, whereby this cutting edge 22 will be caused to drop readily into sharp depressions in the surface of the article being peeled and likewise will be maintained firmly or positively in cutting engagement with the surface portion of the article so that skipping of cutting edge across portions of the surface of the article is minimized.

In the cross-sectional view, Fig. 4, I show a cutter 16' of loop-shape and having side bars 19' and 20' both of which bars are sharpened so as to provide cutting edges 28 and 29 along the slot 21' occupying a position at the bottom of the channel formed by the side members 19' and 20'. In this cutter the axis of rotation A'—A' is disposed on a transverse plane Y'—Y' positioned substantially centrally between the cutting edges 28 and 29 and offset downward from the cutting plane X'—X'.

In Figs. 5 and 6, I show a handle 30 of elongated form similar to that ordinarily employed for paring knives. This handle has a longitudinal center line C—C and in the forward end thereof has a bore 31 formed coaxially with the center line C—C, to receive a ferrule or bearing 32 which supports the rearwardly projecting shaft element 33 of a cutter 34. The cutter 34 is stamped from sheet metal so as to provide an elongated loop comprising a pair of side members 35 which slope downward and inward toward a slot 36 which is parallel to the center line C—C. The lower portions of the side members 35 are sharpened so as to form cutting edges 37 disposed, as shown in Fig. 6, above the plane of the center line C—C. The front ends of the side member 35 are connected by a front end member 38 which is curved and sharpened so as to form a gouge by which to dig out portions of an article which is being prepared. At the rear end of the cutter 34 the metal of the stamping extending rearward from the side members 35 is curved downwardly at 40 and in the stamping process is formed into a metal tube so as to provide the shaft element 33 of the cutter 34. This shaft element 33 is positioned so as to define an axis of rotation coinciding with the center line C—C, and which axis of rotation is faced downward from the cutting plane defined by the cutting edges 37. The cutter 34, therefore, has the same characteristics as the cutters 16 and 16', but is pivotally supported at one end only.

For holding the cutter 34 rigid, or without rotation of the handle 30, during the use of the gouge 38, I provide a part 41 on the cutter 34 engageable so as to prevent rotation of the cutter 34 relative to the handle 30. Such part 41 comprises a metal wing brought up from the rear end of the cutter 34 and preferably extended a short distance over the front end of the handle 30, as shown in Figs. 5 and 6, with the lower edge 42 thereof spaced from the upper flattened face 43 of the handle so that the wing 41 may swing through a limited arc in either direction from its central position of Fig. 7 before it engages the top face 43 of the handle 30, as indicated in dotted lines 44. Accordingly, the cutter 34 has limited rotational movement around the axis C—C to permit a free action of the blade in following the contour of an article being peeled, but the cutter 34 may be held from rotation by the thumb of the user, applied as indicated by dotted lines 45 in Fig. 6 so as to force the wing 41 into the position thereof indicated by dotted lines 44 in Fig. 7, wherein the lower edge 42 of the wing will engage the flattened surface 43 of the handle 30 and the cutter 34 will be then non-rotatable relative to the handle 30 so that the gouge 38 may be employed without the necessity of moving the hand of the user from its normal position on the handle 30.

I claim as my invention:

1. In a vegetable peeler of the character described, the combination of: a handle having means defining an axis of rotation; and a cutter connected to said handle so as to have rotation relative to said axis, said cutter comprising a pair of substantially parallel side members, the lower edge of at least one of said members being sharpened so as to provide a cutting edge and the other of said members serving as a guide for the sharpened edge, said cutter being connected to said handle in such a manner that said axis of rotation will be disposed near to said members and in a position below the plane defined by the lower edges of said members, so that a cutting force applied to said cutter on said axis of rotation will simultaneously move said cutting edge forward and exert a force tending to rotate said cutting edge downward around said axis of rotation.

2. In a vegetable peeler of the character described, the combination of: a cutter comprising a pair of substantially parallel members, at least one of said members having the lower portion thereof sharpened so as to form a cutting edge and the lower portion of the other of said members providing a guide for said cutting edge; a handle; and pivot means connecting said cutter to said handle, said pivot means defining an axis of rotation for said cutter extending substantially parallel to said members and in a plane positioned below the plane defined by the lower portions of said members, so that a cutting force applied to said pivot means will simultaneously move said cutting edge forward and exert a force tending to rotate said cutting edge downward around said axis of rotation.

3. In a vegetable peeler of the character described, the combination of: a cutter comprising a pair of substantially parallel members, at least one of said members having the lower portion thereof sharpened so as to form a cutting edge and the lower portion of the other of said members providing a guide for said cutting edge; a handle; and pivot means connecting said cutter to said handle, said pivot means defining an axis of rotation for said cutter extending along in the general direction of said members and in such position that at least a sizable portion of said axis lies below the cutting plane defined by the lower edges of said members whereby reaction to a forward force transmitted from said handle to said cutter will apply a downward force to said cutting edge.

4. In a vegetable peeler of the character described, the combination of: a cutter comprising an elongated loop having a pair of side members connected at their ends by end members, at least one of said side members being sharpened so as to form a cutting edge and the other serving as a guide for said cutting edge; a shaft element extending from one of said end members and defining an axis of rotation for said cutter parallel to said side members and offset downward from the cutting plane defined by the lower edges of said side members; and a handle having bearing means to cooperate with said shaft element of said cutter.

5. In a vegetable peeler of the character described, the combination of: a cutter comprising an elongated loop having a pair of side members connected at their ends by end members, at least one of said side members being sharpened so as to form a cutting edge and the other serving as a guide for said cutting edge; shaft elements extending from the ends of said end members and defining an axis of rotation for said cutter parallel to said side members and offset downward from the cutting plane defined by the lower edges of said side members; and a handle having bearing means to cooperate with said shaft elements of said cutter.

6. In a vegetable peeler of the character described, the combination of: a cutter comprising an elongated loop having a pair of side members connected at their ends by end members, at least one of said side members being sharpened so as to form a cutting edge and the other serving as a guide for said cutting edge; a shaft element extending from one of said end members and defining an axis of rotation for said cutter parallel to said side members and offset downward from the cutting plane defined by the lower edges of said side members; a handle having bearing means to receive said shaft element of said cutter; and means selectively manually operable to limit rotation of said cutter relative to said handle.

7. In a vegetable peeler of the character described, the combination of: a cutter comprising an elongated loop having a pair of side members connected at their ends thereof by end members, at least one of said side members being sharpened so as to form a cutting edge and the other serving as a guide for said cutting edge; a gouge formed on one of said end members and a shaft element extending from the other of said end members and defining an axis of rotation for said cutter substantially parallel to said side members; a handle having bearing means to cooperate with said shaft element of said cutter; and means operative to prevent relative rotation of said cutter and said handle.

8. In a vegetable peeler of the character described, the combination of: a cutter comprising an elongated loop having a pair of side members connected at their ends thereof by end members, at least one of said side members being sharpened so as to form a cutting edge and the other serving as a guide for said cutting edge; a gouge formed on one of said end members and a shaft element extending from the other of said end members and defining an axis of rotation for said cutter substantially parallel to said side members; a handle having bearing means to cooperate with said shaft element of said cutter; and a wing projecting from said cutter near said shaft element engageable to control rotation of said cutter member during the use of said gouge.

JESSE P. WHANN.